3,034,947
GAS-AEROSOL FILTER MATERIAL

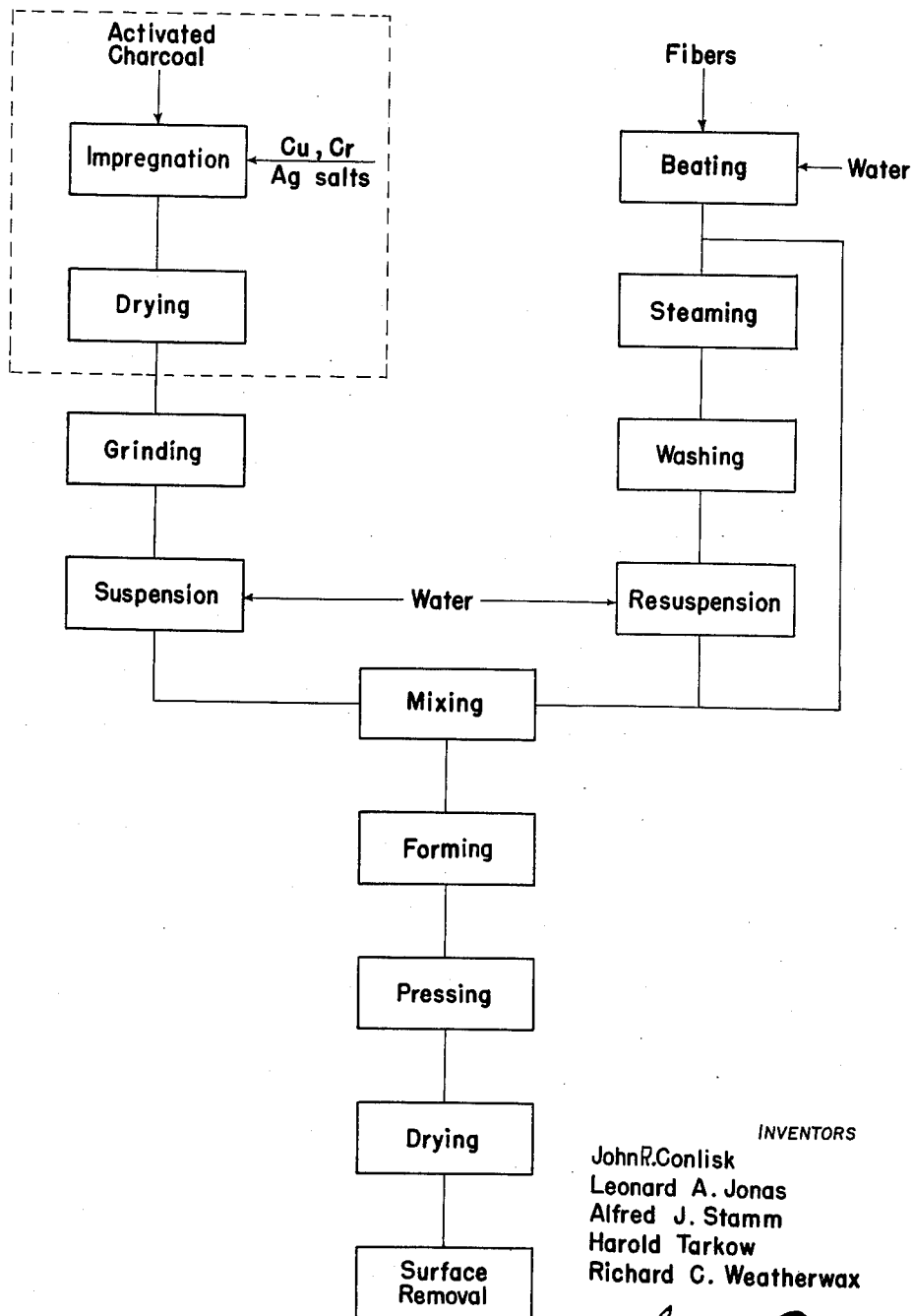

John R. Conlisk, Darlington, and Leonard A. Jonas, Baltimore, Md., and Alfred J. Stamm, Harold Tarkow, and Richard C. Weatherwax, Madison, Wis., assignors to the United States of America as represented by the Secretary of the Army
Filed Apr. 25, 1956, Ser. No. 580,683
3 Claims. (Cl. 162—181)
(Granted under Title 35, U.S. Code (1952), sec. 266)

The invention described herein may be manufactured and used by or for the Government of the United States of America for governmental purposes without the payment to us of any royalty thereon.

This invention relates to carbon-containing fibrous material which is suitable for use as an air-purifying filter material or diffusion barrier.

The invention further relates to a wet process of manufacturing such material which permits the use therein of activated charcoal impregnated with oxides of copper, silver, and chromium.

The drawing shows a flow sheet of a process for preparing a diffusion board from wood pulp in accordance with our invention.

For protection against airborne toxic agents such as those used in warfare, it is necessary to exclude aerosols, i.e. gaseous suspensions of finely divided solids or liquids, and also to exclude toxic gases. It has been the general practice in the past to provide gas masks, collective protectors, etc., with a fibrous filter for protection against aerosols and a body of activated carbon to adsorb high molecular weight gases. Other chemicals may be employed to eliminate gases, such as carbon monoxide or chloride, which are not readily adsorbed.

In recent years there has been considerable development of filter materials which combine the fibrous material giving protection against aerosols with the adsorbent carbon giving protection against high molecular weight gases. These filter materials consist of masses of fibers, including ultra-fine fibers of glass or asbestos, impregnated with activated carbon. These materials are known as "gas-aerosol filter materials" and will be referred to by that term in this specification.

Filtration, which is the method of purification discussed above, involves passing a current or mass of air through the filter. A system of protection has been recently developed which does not depend on mass flow of air through a filter but employs diffusion. This system is disclosed and claimed in application S.N. 423,258, filed April 14, 1954, by Saul Hormats et al. It involves the use of a diffusion barrier having an area sufficient to permit the exchange of carbon dioxide and oxygen to take place by diffusion without any net flow of air through the material. These diffusion barriers are formed of fibrous material impregnated with activated carbon, which serves to adsorb high molecular gases. These barriers thus protect by physical exclusion of airborne particles, adsorption, and selective diffusion of gases of different molecular weights. The gas-aerosol filter materials described above constitute excellent diffusion barriers. However, due to the conditions prevailing, the ultrafine fibers of glass, etc. are not necessary and we have produced from wood pulp a carbon-impregnated fiber board which is very suitable for this purpose. This will be termed "diffusion board."

Activated carbon may have its adsorptive properties enhanced by impregnation with various materials, which serve as catalysts. A particularly desirable carbon is that designated by the Chemical Corps, United States Army, as "ASC whetlerite." This carbon is impregnated with silver, cupric, and chromic oxides and is produced in the following manner. The charcoal is immersed in a solution which typically contain $12.0 \pm 0.5\%$ $NH_3$, $8.0 \pm 0.5\%$ $CO_2$, $8.5 \pm 0.5\%$ $Cu^{++}$, $0.3 \pm 0.005\%$ $AgNO_3$, and $3.2 \pm 0.2\%$ $CrO_3$, dissolved in water. The percentages are rather critical, but the silver nitrate may be reduced as low as 0.2% and the chromic oxide may be increased somewhat but should be no more than 5%. Generally equal volumes of charcoal and solution are mixed and the charcoal then filtered and dried in a rotary drum drier while air having a temperature of about 350° F. is drawn through the drum. This leaves the charcoal impregnated with silver, cupric, and chromic oxides.

Two other types of impregnated charcoals are type A whetlerite, impregnated with cupric oxide, and type AS, impregnated with cupric and silver oxides. These and other similar materials may be produced by the methods disclosed in United States Patents 2,511,288, 2,511,289, 2,511,290, and 2,523,875.

Our carbon-containing fibrous materials are prepared by a wet process, similar to the conventional processes of preparing paper or fiber board. One of the particular objects of our invention is to prepare by these methods a fibrous material containing the highly desirable ASC whetlerite. As pointed out above this whetlerite contains chromic oxide, which is, as is well known, highly soluble in water. Early attempts to employ the usual paper making processes resulted in complete elimination of the catalytic effect of the chromic oxide as evidenced by ability to adsorb cyanogen chloride. This was believed to be due to the leaching of the chromic oxide from the charcoal and it was naturally assumed by competent authorities that a wet process could not be used for incorporating ASC whetlerite. We have now found that by employing certain specific conditions we can use this very desirable form of impregnated charcoal in a wet process.

It has been found that the chromic oxide actually is not removed in appreciable quantities by the water, over a period of several hours, provided the charcoal is impregnated and dried as described above before being added to the water. However, if the drying step following the impregnation is omitted, the process is completely unsuccessful.

When the charcoal is dried before being suspended in water, immersion for periods up to about 8 hours results in no significant leaching of the chromic oxide. Over longer periods, for example overnight, the leaching becomes excessive.

The early failures referred to above have been found to have been due to an entirely different cause, namely, deactivation of the chromic oxide during the drying of the charcoal-containing fibrous material. We have found that this deactivation can be prevented or minimised by certain expedients, namely, the control of the drying temperature and, when wood fibers are employed, preliminary treatment of the fibers to remove reducing sugars. While we do not wish to be bound by theory, it appears that at high temperatures in the presence of moisture and carbon, and particularly in the presence of reducing sugars, the chromium is reduced from its hexavalent to its trivalent state, in which form it is ineffective to catalyze the adsorption of cyanogen chloride.

We have found that the temperature of the mtaerial during drying should not exceed 120° C. either for filter materials formed of esparto, cotton, fiber, hemp, rayon, etc. (in addition to carbon and asbestos or glass fiber) or for diffusion board formed of wood pulp. The driers handling these materials may be operated with air temperatures as high as 160° C. so long as free water exists, but as the water content drops below the saturation point (about 30 percent by weight) the temperature should be reduced to that given above.

In the case of diffusion board formed of wood pulp it is desirable that the final temperature be about 80° C. (175° F.) or lower and that the final moisture content be not less than about 2 percent by weight. There are further limitations on the drying temperature for diffusion board which will be given later in this specification.

Examples 1 and 2 describe the preparation of gas-aerosol filter materials in accordance with our invention.

EXAMPLE 1

*High Resistance Gas-Aerosol Filter Material*

On a laboratory scale, fibers were prepared by redispersing in water Chemical Corps type 6 filter material, which is a high-resistance filter asbestos-bearing paper used in the single-layer, pleated aersol filter element of the U.S. Army M–11 canister. The composition was as follows.

| Fibers: | Percent by weight |
|---|---|
| Causticized esparto | 48.0 |
| Cotton floc | 33.8 |
| Hemp | 8.5 |
| Blue Bolivian asbestos | 9.7 |

The asbestos fibers, which are the effective aerosol-filtering fibers, have diameters in the range of 0.1 to 1.0 micron and lengths averaging about one millimeter. The matrix fibers (esparto, cotton and hemp) are roughly 20 to 40 microns in diameter and about 3 mm. in length.

Standard Chemical Corps ASC whetlerized charcoal, described earlier in this specification, was pulverized and screened through a U.S. 100 mesh screen. A typical size distribution of the pulverized charcoal was as follows.

| U.S. sieve No.: | Weight percent |
|---|---|
| −100 +120 | 0.5 |
| −120 +140 | 1.0 |
| −140 +170 | 37.5 |
| −170 +250 | 35.5 |
| −250 +270 | 6.0 |
| Thru 270 | 18.0 |
| Loss | 1.0 |

Fifteen grams of charcoal and 10 g. of type 6 paper were placed in a Waring Blendor. The Blendor was filled with water (approximately 1 liter), and the resulting mixture was beaten for one minute. This slurry was then formed into an 8″ x 8″ pad using a square sheet mold embodying a removable wire screen (mesh size 100). The pad was then removed from the screen by placing the screen plus the wet paper pad between blotters, which caused separation of the screen from the pad. The pad was then oven dried between fresh blotters.

Pads formed as described above were then tested for cyanogen chloride penetration. First air at 80% relative humidity was drawn through the pads until they came to constant weight. Next, air containing 2 mg./liter of cyanogen chloride at 80% relative humidity was drawn thru at a constant rate of 10 liters/min. Penetration of cyanogen chloride through the pads were detected by use of an iodine-pyridine indicator. The time during which air was drawn through before the first penetration of cyanogen chlorine is a measure of the adsorptive power and is termed the "CK life" of the pad.

Pads were dried over night in a well-ventilated oven at air temperatures of from 80° C. to 180° C. The actual temperature of the pads during initial stages of the drying was less than oven temperature due to heat losses during evaporation of the equilibrium water, but the final temperature was substantially that of the oven. The pads were placed in the oven in such manner as to allow evaporation of water vapor from both sides.

Results are shown in Table I.

TABLE I

| Oven temp., ° C.: | CK life of a 3-pad layer, minutes |
|---|---|
| 80 | 28 |
| 100 | 29 |
| 120 | 28 |
| 140 | 17 |
| 160 | 14.8 |
| 180 | 4.2 |

As will be noted from the above data, the cyanogen chloride adsorption decreased sharply when the oven temperature was increased above 120° C.

EXAMPLE II

*Low-Resistance Gas-Aerosol Filter Material*

The fibers used were as follows.

| Fiber: | Percent by weight |
|---|---|
| Viscose rayon (1.5 denier, ⅛ in. cut) | 60.0 |
| Cotton floc | 30.0 |
| Hemp | 5.0 |
| Blue Bolivian asbestos | 5.0 |

The asbestos fibers, which are the effective aerosol filtering fibers, had diameters in the approximate range of 0.1 to 1.0 micron and an average length of about one millimeter. The matrix fibers (rayon, cotton and hemp) were roughly 20 to 40 microns in diameter and about 3 mm. in length.

The charcoal was Chemical Corps ASC whetlerite, prepared as described above, then ground to pass a standard U.S. 100 mesh sieve.

A typical size distribution was as follows.

| U.S. sieve No.: | Weight percent |
|---|---|
| −100 +120 | 0.5 |
| −120 +140 | 1.0 |
| −140 +170 | 37.5 |
| −170 +250 | 35.5 |
| −250 +270 | 6.0 |
| Thru 270 | 18.5 |
| Loss | 1.0 |

The fibers and charcoal were separately slurried in water in the ratio of solids to water of about 1:100 by weight.

The two slurries were mixed in such proportions as to give 66% carbon and 34% fibers by weight. The mixture was thoroughly beaten and formed on a crinoline backing on a standard papermaking screen, then oven dried at a temperature of 120° C.

The diffusion boards of our invention are structural fiberboards similar to commercial insulating fiberboards, but containing from 15 to 50 percent, dry weight, activated carbon, preferably ASC charcoal. They are sufficiently porous to permit the interchange of carbon dioxide and oxygen by diffusion.

The accompanying drawing shows a typical flow sheet. The portion enclosed in dotted lines, i.e. the preparation of the impregnated charcoal, while essential to the success of our process, is ordinarily carried out separately from the other steps.

Various aspects of our method are discussed in detail in the following portions of this specification.

We form the board of a high yield wood pulp selected from the group consisting of groundwood pulp, defibrator pulp, semichemical pulp, repulped newspaper and combinations thereof. The finished board should have a specific gravity in the range of .33 to .45, depending on the carbon content, the required specific gravity increasing with the carbon content.

If the specific gravity is too low, aerosol penetration will be excessive. If it is too high, the diffusion of oxygen, carbon dioxide, and water vapor will be inadequate.

For boards of ¼ inch thickness, the texture should be such that aerosol concentration on the inside of a barrier formed of this material is .01 percent or less of that on the outside, and such that carbon dioxide has a diffusion constant through the board of not less than $1.7 \times 10^{-2}$ sq. cm./sec.

In order to obtain satisfactory board, various expedients are necessary in the process of preparation. They are:

(a) Removal by reducing sugars from the pulp by steaming followed by washing (in the case of some pulps this has been done in the course of their manufacture and need not be repeated).

(b) Limitation of the drying temperatures and final moisture content, as described earlier in this specification.

(c) Impregnation and drying of the charcoal before its addition to the pulp.

(d) Pressing the wet fiberboard mats at pressures of 75 to 200 pounds per square inch.

(e) In case of coarse pulp, blending with fine pulp or preliminary beating to enable the board to meet the final specific gravity and diffusion requirements.

(f) Removal of a relatively impermeable layer from each face of the finished board, as by planing or sanding.

As mentioned earlier in the specification, several types of wood pulp have been found suitable. One that has been employed is a relatively coarse aspen groundwood pulp of the type employed in making commercial insulating board. We have found that the specific gravity of the board produced from such a pulp can be controlled by the addition of a "slow" or fine pulp. For example, employing one hundred percent insulating board stock incorporating 28 percent ASC charcoal by weight (based on the finished product), and pressing at 100 lb./sq. in., board having a specific gravity of 0.34 was obtained. A board made under identical conditions but containing 30% of a "slow" aspen groundwood stock had a specific gravity of 0.39. Intermediate proportions gave intermediate densities. Instead of incorporating a certain proportion of fine pulp, the entire feed may be subjected to a controlled beating with similar results.

This type of pulp will be referred to hereafter as "groundwood pulp."

Repulped newspapers, a second type of pulp that we have employed, is ordinarily derived from a softwood groundwood pulp mixed with about 15 percent chemical pulp. This pulp is relatively fine or "slow" as compared to the groundwood stock described above.

A third type of wood pulp is that prepared from Douglas fir in accordance with the process described in Asplund Patents 2,008,892 and 2,141,851. This will be hereafter termed "defibrator pulp." As will be noted from the above patents, this pulp is subjected to high temperature steam treatment in the course of its manufacture. This produces certain differences in behavior in our process as compared to the two types of pulp previously described.

The pulp, of whatever type, should be treated or blended so as to give the desired specific gravity and diffusion constant while keeping the pressure within the limits specified above, i.e. 75 to 200 pounds per square inch.

Improved results are produced with all three of the pulps if they are thoroughly washed prior to forming the board. Water solubles in the pulp, by coating the charcoal or reacting with the active ingredients within the charcoal, lower the filtering efficiency. For example, boards formed of washed defibrator pulp and type A charcoal were found to give definitely improved "breakthrough time," employing carbon tetrachloride as a test vapor, as compared with unwashed pulp. It was further found that charcoal soaked in an aqueous extract of defibrator pulp and then dried adsorbed carbon tetrachloride much more slowly than did the untreated charcoal.

The most important reason for washing, however, is to remove potentially decomposable carbohydrates and readily liberated acids. Pulps are formed of lignin and carbohydrates. The latter are polymers of simple sugars. A portion of the carbohydrate fraction is readily hydrolized by heat, water and acids to simple sugars. These sugars (e.g. xylose and glucose) are reducing agents and in the presence of heat and moisture reduce hexavalent chromium to the trivalent state, in which it does not catalyze the adsorption of cyanogen chloride.

Since the sugars are water-soluble, they may be removed by washing with water. Moreover, by a preliminary treatment with hot water or with steam, potentially decomposable carbohydrates may be broken down and the decomposition products may then be removed by washing, prior to the introduction of the charcoal, so that they are not present at the drying stage. Since progressively greater decomposition takes place as temperatures are increased, the temperature in this preliminary treatment should be at least as high as that at the drying stage. For example, if the drying temperature is 120° C. the water temperature during the pretreatment should be at least 120° C. and preferably 150° C. Similarly if, as is convenient, the water temperature in the pretreatment stage is 100° C., the temperature of the boards in the drier should not be above 100° C. and preferably not above 80° C.

As has been mentioned above, defibrator pulp, produced by the Asplund process, is subjected to high temperature steam, of the order of 170°–180° C. during the course of its manufacture. Diffusion board made from this pulp is relatively insensitive to drying temperatures in the range specified above.

Aspen (hardwood) groundwood pulp on the other hand, is subjected to a temperature of only about 60°–70° C. during its manufacture. Diffusion boards containing ASC charcoal formed from this pulp, without preliminary treatment, showed marked improvement when dried at 80° C. as compared to higher temperatures. When the pulp was heated for one hour at 100° C., drained and washed before being formed into the diffusion board containing ASC charcoal, marked improvement at higher drying temperatures was attained.

Repulped newspaper, derived from a softwood containing about 15 percent chemical pulp, was formed into diffusion board containing ASC charcoal. The effects of hot water treatment and drying temperature was studied. It was found (a) that holding the slurry at 100° C. for 2 hours followed by washing and draining and (b) drying at temperatures not above 100° C. gave improved adsorption of cyanogen chloride.

We have found that wet formed fiber boards produced by any of the commercial process have on each surface a skin or layer which is highly resistant to the diffusion of gasses. By removing these surfaces, e.g., by planing or sanding, we considerably increase the rate of diffusion. The removal of about .03 in. is sufficient. On boards of about ¼″ to ⅜″ thickness, the removal of this amount was found to increase the diffusivity constant for carbon dioxide by from about 40 to 100 percent, varying with the particular boards.

The following examples illustrate the large scale production of diffusion board.

EXAMPLE 3

Reprocessed newspaper (6,570 lb., air dry) and ASC charcoal (6,322 lb.) were processed batchwise in two hydropulpers using fresh water. Total solids consistency was 3.64 percent. The slurry was run into 8' x 12' deckle boxes and vacuum applied on the top. The mat was lifted by suction and transferred to an endless belt. Formation was good, the strength of the sheets being sufficient to withstand the transfer to the hydraulic press. The mats were pressed at 100 lb. per sq. in. for ½ minute, and then sent to the driers. Travel in the drier was at the rate of 15 to 16 inches per minute, giving from 1.92 to 1.8 hours' drying time. The temperature of the circulated air was 300° to 310° F. (148°–155° C.) in the wet and mid sections, and 220° to 260° F. (106°–126° C.) in the last section. The temperatures of the boards themselves were considerably lower, being appreciably below 210° F. (99° C.) in the first half of the drier and apparently never exceeding that temperature. The boards came out at a moisture content of about 1.5 percent. The board thickness was .38 in. The boards were sanded on both sides in a rotary 3-drum sander to a ¼ inch thickness in two passes. About 33 percent by weight was removed by sanding.

Samples from different sections had specific gravities ranging from 0.434 to 0.445, the average being 0.44. The boards contained about 50 to 55 percent charcoal. The carbon dioxide diffusion constant was $2.1 \times 10^{-2}$ sq. cm./sec.

EXAMPLE 4

A pulp slurry containing two percent solids was prepared, the pulp consisting of 90% aspen (hardwood) groundwood insulating board stock and 10% papermill groundwood. Finely pulverized ASC charcoal was fed by a screw feeder which delivered the charcoal at a known rate to a funnel down the sides of which water was running. The feed rate was controlled to give a carbon content of 17 to 20 percent in the finished boards. The combined slurry was delivered to a board machine and sheets formed on a suction cylinder. Two sheets were laminated and then passed to the nip rolls. Pressure on the nip rolls was adjusted to give a wet caliper of $15/32$ in. The boards then entered a 275 foot long dryer. The first section, about 90 feet in length, was at an air temperature of 270° F. (132° C.), the center section had an air temperature of 220° F. (105° C.), and the last section on air temperature of 175° F. (80° C.). The rate of travel in the drier was 1.35 ft./min. and the total drying time 3½ hours.

The boards were cut to a size of 8 x 12 ft. and about $1/16$ in. was planed from each surface, leaving a thickness of about ¼ inch. The average density was about .38 gram per cubic centimeter. The carbon dioxide diffusion constant of different samples ranged from 1.7 to $2.1 \times 10^{-2}$ sq. cm./sec.

In summary, the carbon containing fiberboard may be made as follows:

(1) It should be made from a high yield wood pulp selected from the group consisting of groundwood pulp, defibrator pulp, semichemical pulp, repulped newspapers or combinations thereof.

(2) The pulp should be blended, or part or all of the pulp beaten, to a degree necessary to cause the final board to conform to requirement (6) below.

(3) The pulp slurry should be steamed at least at atmospheric pressure for one to two hours and then subjected to a thorough water wash to remove sugars formed by hydrolysis of the cellulose. Either or both of these steps may be omitted if the pulp has been subjected to similar treatment in the course of its manufacture.

(4) A fresh-water slurry of powdered ASC whetlerized charcoal should be mixed with the pulp slurry just prior to board formation in such quantities as to give a specified carbon content of the final dry board falling between about 15 and 50 percent by weight.

(5) The board may be formed on any type of wet-form fiberboard equipment.

(6) The wet mat should be pressed at a pressure ranging from 75 to 200 lb./sq. in. or its equivalent in roll pressure and so selected as to give a final dry product with a specific gravity of 0.33 to 0.45 (the higher values for the higher charcoal contents) and, for boards of ¼" thickness, a carbon dioxide diffusion constant of at least $1.7 \times 10^{-2}$ sq. cm./sec.

(7) The fiberboard may be dried in any conventional type of equipment. Initial air temperatures may be as high as 325° F. (162° C.). Just before the fiber saturation point is reached, the temperature should be reduced to 250° F. (122° C.) or lower. The air temperature should be further controlled so that the temperature of the boards does not exceed the temperature employed in step (3), above. The moisture content should be reduced to a value falling between 2 and 6 percent, based on the dry weight of the fiberboard.

(8) The dry fiberboard should be planed or sanded to remove a minimum of $1/32$ inch from each surface. The resulting surfaces should be reasonably smooth and be free from pits and gouged spots. The board should ordinarily be about ¼ in. in thickness.

While we have described several embodiments of our invention in considerable detail, it will be apparent that various other embodiments are possible. We therefore wish our invention to be limited solely by the scope of the appended claims.

We claim:

1. A process of preparing a carbon-containing diffusion board comprising preparing a suspension of groundwood pulp, heating said pulp in water at a temperature at least as high as its atmospheric boiling point, washing said pulp with water to remove water-soluble acids and carbohydrate degradation products, forming an aqueous suspension of said pulp, adding to said pulp finely divided activated carbon which has been impregnated with an aqueous solution comprising chromic oxide and thereafter dried, wet forming said pulp carbon into a mat, pressing said mat, and drying said mat at a mat temperature not exceeding the temperature of the water in said heating step and in no case exceeding 120° C. to produce a substantially dry board.

2. A process as defined in claim 1 wherein said heating step is carried out by steaming said pulp at atmospheric pressure for from one to two hours and wherein said drying step is carried out at an air temperature of about 80° C. after the moisture content has dropped below the fiber saturation point.

3. A process as defined in claim 1 and further comprising removing a layer of at least $1/32$ in. thickness from each surface of said substantially dry board.

References Cited in the file of this patent

UNITED STATES PATENTS

| | | |
|---|---|---|
| 1,520,437 | Pipkin | Dec. 23, 1924 |
| 2,523,875 | Morrell et al. | Sept. 26, 1950 |
| 2,593,146 | Howard | Apr. 15, 1952 |
| 2,963,441 | Dolian et al. | Dec. 6, 1960 |
| 2,979,157 | Clark | Apr. 11, 1961 |

OTHER REFERENCES

Encyclopedia of Chemical Technology, The Interscience Encyclopedia Inc., New York, vol. 9 (1952), pages 817–818 and 826–829; vol. 14(1955), pages 876–879 and 882.